Figure 10:
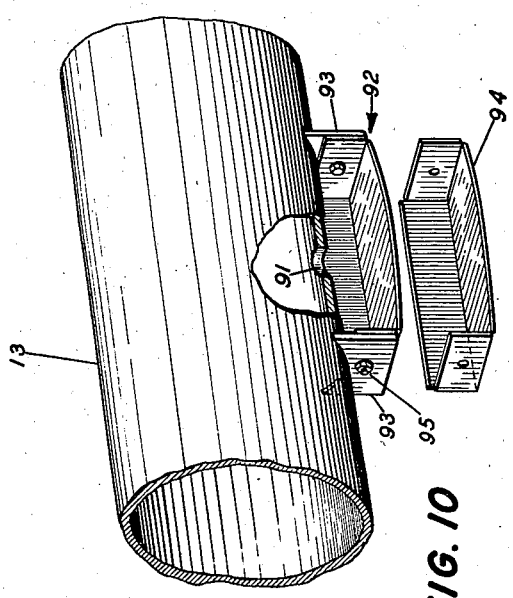

Jan. 28, 1936.  N. B. LUND  2,029,268
LIQUID DISTRIBUTOR
Filed Sept. 3, 1932   4 Sheets-Sheet 1
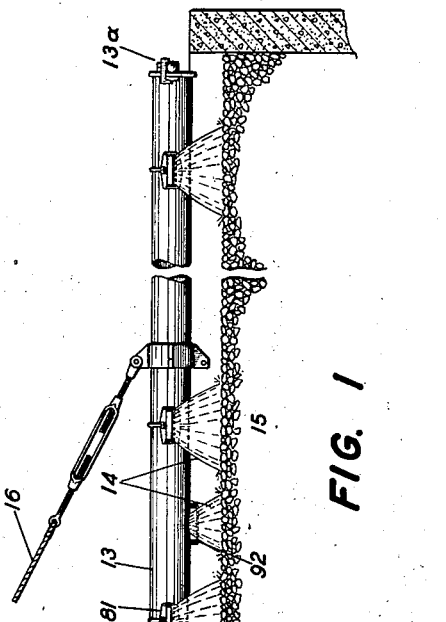
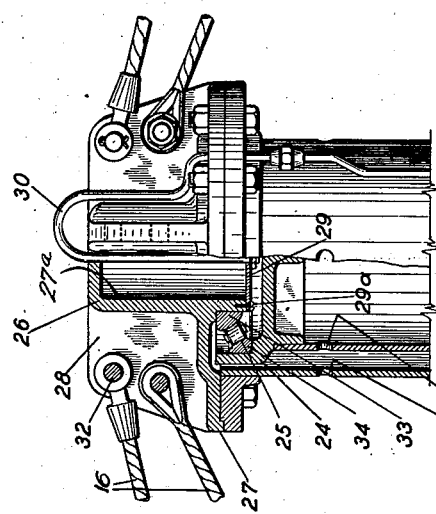
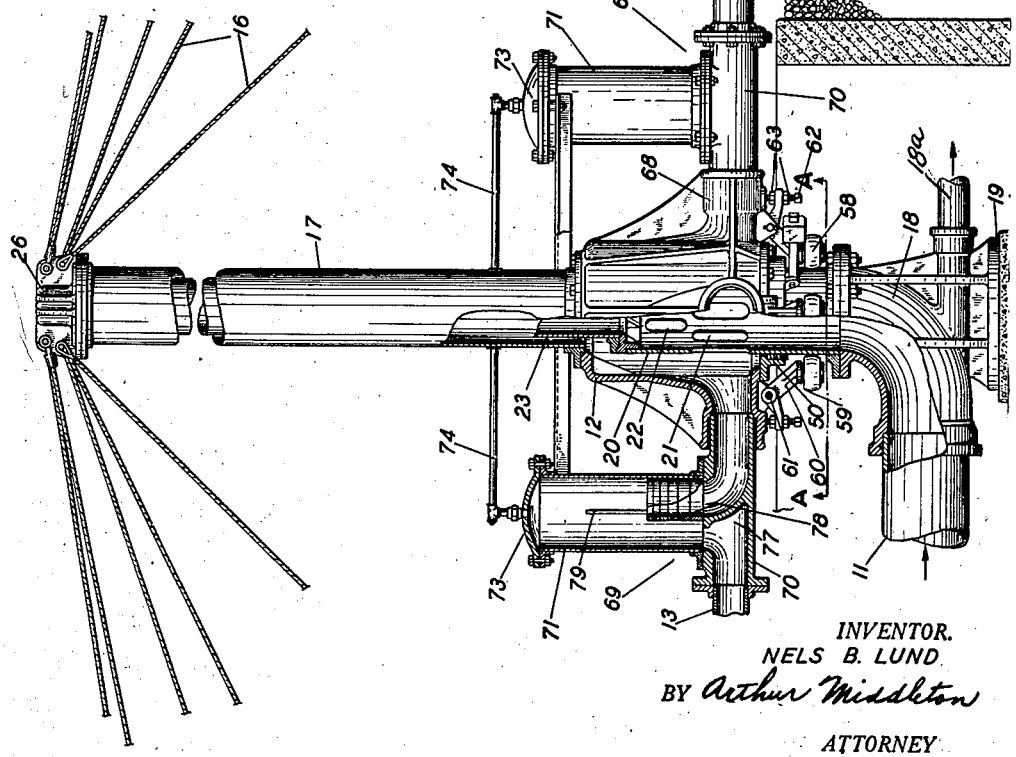
INVENTOR.
NELS B. LUND.
BY Arthur Middleton
ATTORNEY Jan. 28, 1936.  N. B. LUND  2,029,268
LIQUID DISTRIBUTOR
Filed Sept. 3, 1932  4 Sheets-Sheet 2
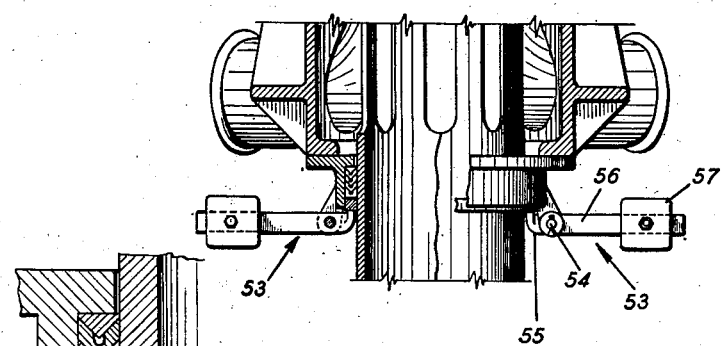
FIG. 4
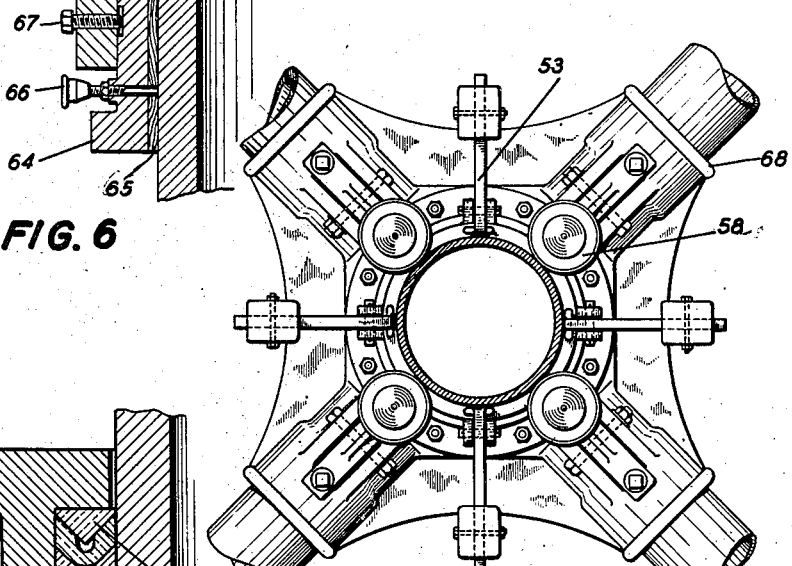
FIG. 6
FIG. 3
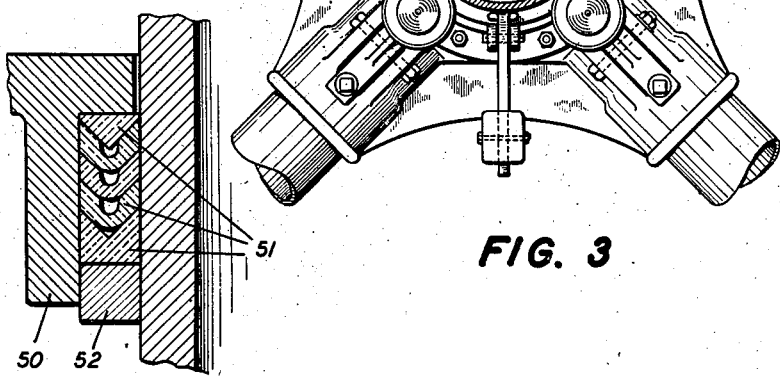
FIG. 5
INVENTOR.
NELS B. LUND
BY *Arthur Middleton*
ATTORNEY Jan. 28, 1936.  N. B. LUND  2,029,268
LIQUID DISTRIBUTOR
Filed Sept. 3, 1932  4 Sheets-Sheet 3

INVENTOR.
NELS B. LUND
BY Arthur Middleton
ATTORNEY

Jan. 28, 1936.   N. B. LUND   2,029,268
LIQUID DISTRIBUTOR
Filed Sept. 3, 1932   4 Sheets-Sheet 4
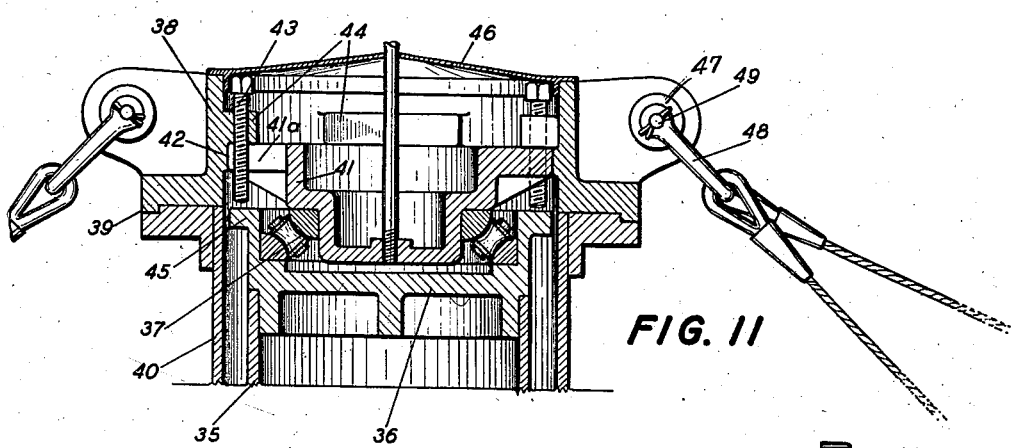
FIG. 11
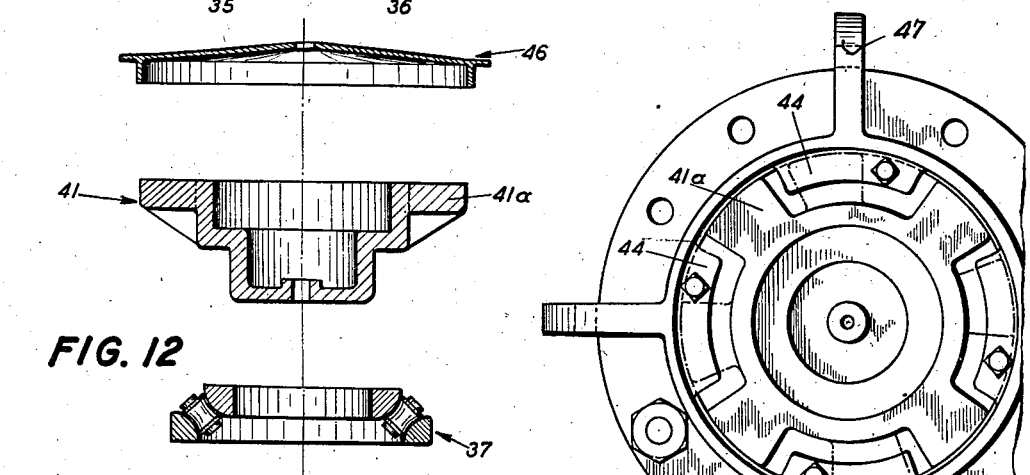
FIG. 12
FIG. 13
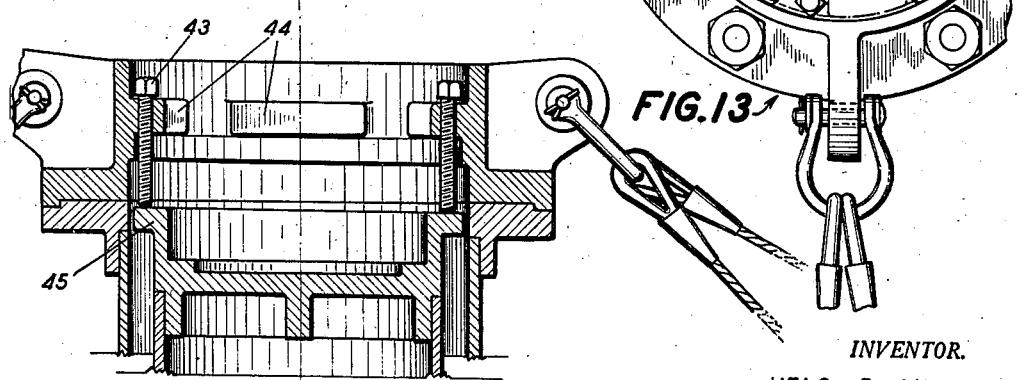
INVENTOR.
NELS B. LUND
BY Arthur Middleton
ATTORNEY Patented Jan. 28, 1936

2,029,268

UNITED STATES PATENT OFFICE 2,029,268

LIQUID DISTRIBUTOR

Nels B. Lund, Seaford, N. Y., assignor to The Dorr Company, Inc., New York, N. Y., a corporation of Delaware Application September 3, 1932, Serial No. 631,625

19 Claims. (Cl. 299—106)

This invention pertains to distributors or disseminating devices for spraying liquid such as sewage liquid, for instance onto filter beds.

More in particular it relates to the rotary type of distributor having radial distributing or spray arms, and in the embodiment preferably considered herein this invention contemplates improvements in the rotary hydraulically operated type of machine, that is the type where the rotation of spray arms is produced by the hydraulic head on the feed supply. More specifically, the rotation may be produced by the reaction of the sprays emitted from orifices arranged laterally upon the radial arms or spray pipes of the rotor.

A principal advantage of a hydraulically operated machine is that it will automatically start and stop with the supply of liquid, for instance where the liquid is supplied by dosing tanks or siphons, or by pumps.

Objects

It is the object of this invention to improve such devices in various ways by redesigning some of their structural details. More in particular it is the object to produce a practical and reliable machine having a minimum of mechanical resistance, and which responds readily to the hydraulic impulse.

The effective head available in sewage plants is sometimes restricted due to local or plant operating conditions. So another object is to produce a machine which operates with a minimum of loss of head, and which otherwise will function properly under a low absolute head.

Further objects are: Increased efficiency and simplicity of the mechanism, an even and suitable distribution of the liquid and an optimum utilization of the filter bed, accessibility of wearing parts, reduction of operating cost and maintenance, and the design of a machine which is made adaptable to a wide range of varying conditions, which readily lends itself to standardization, and which is inexpensive, and light in weight.

It should be understood that the features of this invention although advantageously combined in the preferred type of a hydraulically operated machine, may also apply to mechanically driven or other types.

In order to produce a preferred hydraulic reaction machine of the desired character this invention contemplates improvements in spray nozzles which form the liquid issuing from the orifices of the spray pipes into suitable sprays having an optimum of reactive force; and furthermore it contemplates improvements in the way of anti-friction and self-aligning supporting means for the rotor to make it highly sensitive, that is, readily responsive to the hydraulic driving power; and it also contemplates improvements in the arrangement of sealing means between the rotor and the stationary column, which are reliable, accessible, inexpensive, and offer a minimum of frictional resistance.

In order to be continuously in proper working condition, distributors of this type which have radial sewage spraying arms must be kept perfectly aligned, for the leverage exerted by the weight of liquid or sewage in an arm on the central column is considerable and is variable as well. The invention therefore also contemplates to produce a design of distributor arranged to withstand these or other forces tending to throw the rotor out of alignment.

Features

Important features lie in the design of an efficient spray or delivery nozzle device or distributing attachment, which operates with practically no loss of head, which is readily attachable to the spray pipes, which is of great simplicity, and provided with simple means of adjustment allowing the character of the spray to be controlled in keeping with operating requirements.

The preferred embodiment of the nozzle comprises a unit which is readily clamped to the spray pipe and bodily adjustable thereon for proper relationship with the associated and preferably elongated orifice in the pipe. The nozzle comprises essentially two converging deflecting or lip portions which flatten out the spray or stream into a fan-like shape emitting the same substantially laterally and in a horizontal direction from the spray arm, in a manner to secure proper direct reaction from the sprays upon the arms, while securing suitable distribution. The clearance between the lips is variable or adjustable, and allows the character of the spray to be varied. The nozzle is in the form of a unit which readily lends itself to standardization and which is applicable for a great range of conditions.

Broadly speaking this is a nozzle of substantially flat configuration, and which by its character is adaptable to a great variety of shapes and sizes of orifices, and effective to change the shape of the spray efficiently, that is with a minimum loss of head.

It has been found to be important for the practical success of this new nozzle that the front edges of the lips are formed with a forward or convex curve which makes the center portion of the nozzle mouth somewhat narrower than the sides, providing for a smooth transition from the center to the sides of the mouth. The central constriction of the mouth of the nozzle thus obtained has been found to produce a very desirable type of spray which is evenly and coherently developed, and of a character to create an optimum effect in its reactive driving power and liquid distribution.

Another aspect of the lip formation just described is noted with respect to the lower lip. The central extreme forward portion of the delivery end of the lip extends beyond the lateral portion thereof. The lip has a substantially plane supporting surface which extends with a slight upward slope from adjacent the orifice, so that the stream of liquid will leave the supporting surface of the lower lip at a level which is slightly higher in the center than at the sides. This is to induce desired characteristics of the stream or spray with regard to distribution.

It has also been found that laterally adjusting the nozzle bodily relative to the orifice upon the spray pipe will compensate for a tendency of the spray toward lateral drift. This adjustment will place the axis of the spray at right angles to the spray pipe, thus permitting the utilization of the maximum reactive force available from the spray, and avoiding losses.

Furthermore it is possible to regulate the discharge volume by shifting the nozzle somewhat in vertical direction relative to the associated orifice in the spray pipe, thus partly covering the orifice and throttling the discharge.

These simple expedients of adjustment make it possible to control the desired coverage of area independently of the necessary discharge volume, and in keeping with the amount of reactive force desired to operate the machine. They also make it possible to adjust the sprays so that a smooth and gradual increase in the discharge will be noted, tapering from a minimum at the center to a maximum at the extremities of the arms.

The size of the orifices in the arms may be arranged to increase toward the outer extremity corresponding to the increase in discharge required in the outer zones. It is important and economical that the adaptability of the new nozzle permits the use of one size nozzle for many sizes of orifices. The nozzle as shown is simple, rugged, and readily accessible for adjustment and cleaning.

Considered as an article of manufacture, the nozzle embodying the foregoing features constitutes an attachment or device or unit which is adaptable to orifices of any desirable shape, a multiple of which may be arranged along a distributing arm. As a specific instance a nozzle body portion or frame of oblong shape may be attached to the exterior surface of a distributing arm so as to surround the orifice which it is to be associated. In this way an attachment of general adaptability is obtained which permits to convert the streams issuing from such orifices into flattened fan-like sprays or streams of desirable characteristics as to shape, direction, and reactive power respectively. In other words, there exists a constructional distinction in the relationship between the orifice of a distributing arm and the nozzle unit. This relationship is such as to enable the attachment to meet varying requirements of purpose and changing operating conditions of a distributor.

It is desirable to have distributors of this type operate with wide variations in the volume of liquid being fed thereto because the flow of sewage in cities has sharp daily peaks of volume and somewhat corresponding valleys, so the distributors of this invention are devised to operate dependably and preferably automatically irrespective of the extent of sewage flow. The hydraulically operated type of machine will start and stop with the supply of liquid and together with the present improved type of spray nozzles it will provide for an efficient driving force and incidentally for a suitable liquid distribution.

In order to make the rotor of the reaction machine readily responsive to the reactive force of the sprays so as to obtain the full benefit from the hydraulic impulse and also in order to shorten the time of acceleration of the rotor during the intermittent operation of this machine, another feature therefore resides in improved means for operatively supporting the rotor which offer a minimum of mechanical resistance to its rotation.

The diameter of the rotor may in some instances run into the hundreds of feet so that a slight disalignment in the central support will be multiplied in the long spray arms. For this reason it is necessary to keep the rotor in perfect alignment and also in view of the fact that the leverage exerted by the weight of the sewage or liquid in an arm on the central column is considerable and is variable as well. So another feature is concerned with means for facilitating and securing the alignment of the rotor, and producing a design of distributor arranged to withstand the forces which may tend to unbalance the rotor.

More specifically, the rotor of such machines usually has a central mast or column from which the radial spray pipes are braced off by means of guy wires or the like. In this machine a hollow mast surrounds a solidly mounted standard. According to this invention the means for supporting and aligning the rotor include an angularly selfaligning and selfcentering thrust bearing at the top of said standard, and also means which make the bearing readily accessible and exchangeable from the top. These supporting and aligning means furthermore include a novel arrangement of sealing means between the rotor and the stardard, in as much as these sealing means fit in with new arrangements in radial bearing or centralizing means at the lower hub portion of the rotor. With such improved arrangements mechanical resistance is reduced to practically a practical minimum.

A more specific feature lies in the arrangement of a substantially square shaped hub portion which constitutes the central distributor chamber or manifold of the rotor, and which eases the flow from that chamber into the pipe arms which extend from the corner portions of the square. The manifold preferably is formed with projecting manifold connections or laterals shaped as for a socket connection with the pipes.

In keeping with the purpose of adapting the machine to a wide range of operating conditions, still another feature provides an improved arrangement in weir boxes, which fits the machine for considerable variations in the head of the feed supply. Such weir boxes are used for instance as attachments to a pair of oppositely arranged arms of a 4-arm distributor, to the effect that with very low head in the supply conduit only one pair of arms are supplied, while the other two arms are running idle. As the head rises due to increased supply, the liquid overflows the weirs in the weir boxes and starts the sprays in the other two arms going. According to this feature the weir boxes are provided with vent pipes preferably leading into the central column of the rotor.

A further rise of head therefore will flood the weir boxes, and the excess or surge will be taken up in the central column of the rotor as the liquid is allowed to rise therein. The essence of the feature therefore is that the central column is allowed to function in the way of a buffer or head tank aside from its ordinary function as a bracing mast for the distributing pipes.

The invention possesses other objects and features of advantage, some of which, with the foregoing, will be set forth in the following description.

In the accompanying drawings I have illustrated the best embodiment of my invention known to me, but such embodiment is to be regarded as typical of many possible embodiments, and my invention is not to be limited thereto.

In the drawings Fig. 1 shows an elevational view of the distributor with some parts shown in section and others foreshortened so that a large scale could be used for this figure. Fig. 2 is a partial vertical sectional view showing the crown on the central column. Fig. 3 is a view looking upwardly taken along the line A—A in Fig. 1. Fig. 4 is a partial sectional view showing the manner of causing pressure on the packing rings. Fig. 5 shows details of the packing rings. Fig. 6 is a modification showing a combination of the sealing arrangement with centralizing means. Figs. 7 to 10 show details of the spray device. Figs. 11 to 13 show a bearing arrangement in the crown of the rotor and the manner in which it is made accessible and exchangeable.

In distributors of this type, sewage liquid is fed through a pipe or conduit 11 to the hollow body portion or hub or manifold 12 of the rotor, from which it flows through arms or distributing pipes 13 from which it is emitted at a plurality of points in the form of sprays 14 onto the filter bed 15. The hub 12 has a central upward hollow extension in the form of a column or mast 17 from which the arms 13 are supported as by guy wires 16. The rotor, that is the assembly of hub, arms, wires and mast, is mounted for rotational movement on a vertical axis, the motivating power for which is furnished by the reaction produced by the emitted sprays of sewage liquid. For structural and operative reasons it is preferred to arrange the arms 13 with a slight outward and upward slope.

The feed to the radial arms 13 is arranged to pass from the feed conduit 11 upwardly through an elbow 18 having a flanged base portion 19, and into a dispersing head 20 secured to elbow 18 on top thereof. The head is slotted as at 21 and 22 to more thoroughly disperse or distribute the feed into the hub. Mounted upon the head 20 is a tubular member or standard 23 extending within the rotor column 17. The standard 23 is arranged at the top to accommodate a dished member or casting 24 to serve as a base for an end thrust bearing 25 upon which the rotor is operatively supported through the cap member 26 which has a centered flange connection 27 with the top of the rotor column 17.

The cap member is formed in the way of a casting with central hollow portion 27a. This hollow portion as shown has no particular function in the operation of the machine but serves to stiffen the cap member, giving also an opportunity for the suitable arrangement of vertical ribs 28 cast integral with the cap member. The hollow portion therefore may be closed off as by a cover plate 29 held by small screws 29a, providing merely for the passage of a grease pipe 30. Upon the vertical ribs 28 are anchored guy wires 31 as by bolts 32 to brace off the free length of the distributing arms 13.

According to the invention the bearing at the top of the rotor is angularly selfaligning and selfcentering. Consequently the design provides for an efficient and simple end thrustbearing of the spherical roller type with the rollers in conical arrangement. There is an upper and a lower spherical race 33 and 34 fitted into the castings 24 and 26 respectively.

Figs. 11 to 13 show a somewhat modified arrangement of the crown portion, which permits ready inspection and exchange of the bearing from the top without the necessity of dismantling the rotor in any way. Fig. 11 shows the assembly of the crown, whereas Fig. 12 clearly shows the manner in which the bearing is taken apart.

In Fig. 11 the inner or stationary column 35 carries the bed or base member 36 for the thrust bearing 37. The cap of the crown portion consists of two parts, that is an outer cylindrical member or casting 38 having a centered flange connection 39 with the column 40 of the rotor and an inner or cover portion 41 which forms the actual backing for the thrust bearing and which is shown to be centered in the cylindrical outer casting as at 42. The mounting of these parts of the crown portion will be more clear from Fig. 12 showing all the parts in elevation, taken apart, and from Fig. 13 showing in particular the plan view of a bayonet arrangement which allows the convenient upward removal of the cover portion 41 after jack screws 43, which are threaded into lugs 44 of the outer cylindrical casting, have been brought to bear upon a flange 45 at the top of the stationary column, and the weight of the rotor thus been lifted off the bearing, allowing the successive removal of the cover portion 41 and of the roller bearing proper.

The cover portion 41 is provided with projecting flange portions 41a which normally engage under the lugs 44 (as shown in dot and dash in Fig. 13) and thus carry the weight of the rotor. After the jack screws 43 have been operated to take the weight of the rotor from the cover portion, the latter may be upwardly removed by passing the projections 41a (see Fig. 13) through the recesses between the lugs 44. Suitable means (not shown) may prevent the cover portion from undue relative movement or rotation relative to the lugs 44. A protective cover 46 may close the top of the crown. Ribs 47 upon the cylindrical top portion serve as anchoring points for the guy wires as through the medium of shackles 48 and bolts 49.

The lower side of the hub 12 of the rotor carries a stuffing box 50 more clearly illustrated in detail in Fig. 5. The preferred packing for the stuffing box according to this invention consists of a flexible or resiliently deformable material, such as rubber. In the arrangement therein shown it comprises a number of superimposed annular members 51, the annuli having slightly wedging engagement with each other as one member engages in the circular groove of the other. Thus the rubber elements therein contemplated comprise split members which are resiliently compressible and radially expansible, providing in this instance line contact between the packing elements and the column. With the coefficient of friction for wet rubber being very low, this brings the frictional resistance for the packing down to a minimum. It should be understood that the rubber elements therein contemplated may take different shapes for instance that of rubber tubing, or full soft rubber rings, and further that such rubber packing needs relatively low compression as compared with other packing material, in order to keep tight, and will work almost frictionless under the relatively low pressure or head prevailing in the machine.

The type of packing shown will form an efficient seal between the rotor and the stationary column at a desirable minimum of friction when held under a suitable pressure not exceeding a predetermined maximum. Normally such pressure may be exerted through the conventional gland and screw bolt connections. This design however provides for a simple follower ring 52 imposed upon the packing and held in place through an arrangement of weighted levers 53 most clearly shown in Fig. 3 and Fig. 4. A lever is pivoted at 54 upon lugs integral with the stuffing box and includes a short arm 55 which engages upon the follower ring 52 upon the packing, and a relatively longer arm 56 which carries the weight 57. The weight is adjustable upon the lever, thus permitting the adjustment of a predetermined pressure desired upon the packing. All parts of the stuffing box may be split (not shown) so that it could be readily removed without dismantling the rotor.

In the preferred embodiment illustrated the levers 53 are arranged in alternation with the distributing arms 13 and in alternation with guide rollers 58 which are mounted upon the rotor and preferably underneath the base of the distributor arms. These rollers forming a radial bearing or centralizing means cooperate with the special thrust bearing at the top, to furnish a means for positively centering and aligning the rotor. The rollers are arranged to operate upon a track provided upon the stationary column and just below the stuffing box.

It is desirable to make the rollers 58 adjustable relative to the track. The rollers therefore are shown to have a spherical working face 59 (see Fig. 1), and are mounted for slight angular adjustment upon bellcrank members 60. The bellcrank is pivotally mounted upon the rotor-hub at 61 and at its free end carries adjustment means such as a set screw 62 with lock nuts 63, through which the accurate position of a roller is adjusted and fixed. This arrangement of stuffing box, weighted levers and adjustable rollers as illustrated in the preferred embodiment of Fig. 1, makes for great compactness, so that the distance between the base of the feed inlet and the distributor arms is reduced to a desirable minimum.

The detail Fig. 6 shows a modification in which a suitably formed gland for the stuffing box takes the part of the lower radial bearing or aligning means for the rotor. This arrangement is useful where the smaller size of the machine allows the omission of the more expensive arrangement of the guide rollers. In Fig. 6 a gland 64 may be held in place in a manner similar to the one described above with the aid of weighted levers or the like. This gland however has sufficient bearing surface and foot hold in the stuffing box, and moreover is lined with a suitable bearing material such as treated hard wood 65, to form a suitable radial bearing for the lower side of the rotor. The bearing may be greased as indicated by the grease cup 66. The arrangement of the gland on the dry side of the packing prevents sewage liquid from reaching the bearing proper and impairing its efficiency. A screw 67 threaded into the wall of the stuffing box secures the gland or bearing member against undue rotation.

In the embodiment shown (see Fig. 1) the hub 12 of the rotor is a casting substantially square in plan. Each corner portion of that hub is formed with an outlet portion 68 shaped for a bell and spigot connection with the radial distributing arms 13. In this embodiment, arrangement is made for distributing the flow of liquid over one pair or two pairs of spray arms respectively, depending upon the supply of liquid. For this purpose two opposed arms are provided at their base with a weir box arrangement 69. This weir box arrangement includes a short length of pipe 70 inserted between the hub 12 and the spray arms 13 proper. From the pipe 70 rises the weir housing including the cylindrical portion 71 closed at the top by a cover 73 fixed thereon. The housing is shown to have a vent connection through pipe connections 74 leading into the column 17 of the rotor. That column in turn as well as the inner column or standard 23 are provided (see Fig. 2) with vent holes 75 and 76 respectively for communication with the atmosphere. There is a partition or weir 77 in the weir box over which the liquid is forced to rise in order to enter the distributing arm. The height of the weir is made adjustable by virtue of removable weir members 78 which form the weir, and which may be held in registry upon each other by rods 79. In this manner, with low flows, only two arms, that is to say the arms without weir boxes will be active, whereas with the head rising in the supply line, liquid will pass through the weir boxes and enter into the other two arms for distribution. Upon further rise of the head, the liquid will flood the weir boxes whereupon it rises in the central column of the machine thus utilizing said column as a buffer tank for surges in the head of the supply.

Spaced at suitable intervals and arranged laterally upon the distributing arms 13 in a longitudinal sequence are spray orifices 80 from which the sprays are emitted laterally thus furnishing by their reactive force the motivating power for the rotor. According to this invention each of these orifices is provided with a special spray nozzle 81 by which the shape, character, and reactive force of spray, as well as the discharge volume, and the coverage of area, can be suitably controlled. The relative arrangement of the nozzles on the various arms may be staggered so that each nozzle will cover its allotted track or annular area upon the filter bed. The nozzle is designed to change the shape of a spray with minimum loss of head.

This nozzle substantially comprises two coverging lips which are effective to flatten the spray from an orifice into a desired fan-like shape, the clearance between the lips being changeable in a desirable manner.

Figure 8:
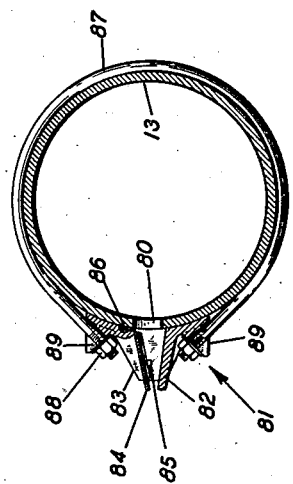
Figure 9:
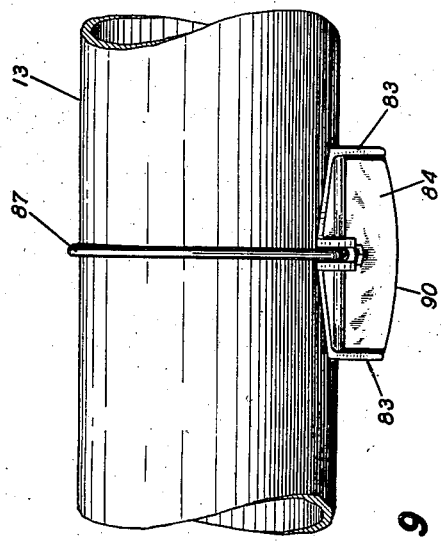
Figure 7:
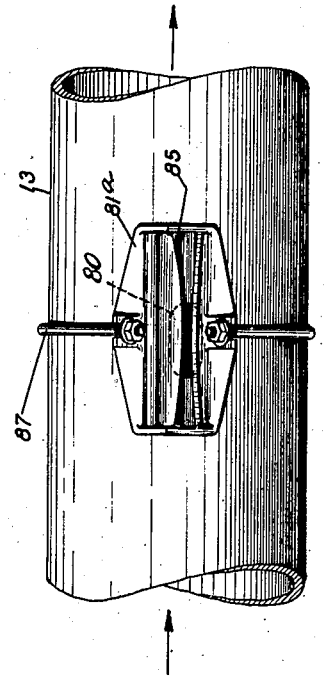

The details of the nozzle are more clearly shown in Figs. 7, 8, 9, from which it can be seen that a nozzle unit as preferably shown includes a body portion or frame 81a formed with a lower lip 82, lateral flange portions or ribs 83 rising from said lip and forming the lateral confinement for a corresponding upper lip 84.

The upper lip of the nozzle is made adjustable or movable so that the shape and character of the spray can be changed to suit various conditions and requirements. In the embodiment shown the upper lip is detachable, and formed with a ledge 85 on each side and arranged to have contact with the ribs 83 of the body portion. The base of the lip is formed with a beaded portion 86 which fits into a corresponding groove in frame 81a. The upper lip is thus held in place in proper relationship to the lower lip, when the body portion 81a is attached or clamped to the distributing pipe by means of a circular clamping member 87 held by nuts 88 anchored upon lugs 89 formed upon the upper and the lower side respectively of the frame 81a.

The lip is preferably made of a noncorrosive springy metal such as hard brass or spring phosphor bronze. The lip can then be adjusted by bending it into the desired angular position relative to the lower lip. The back of the frame 87 is given a curvature to fit the surface of the distributing pipe to which it is attached, and it may be made of cast bronze to prevent corrosion. The orifice 80 from which the spray is emitted through the nozzle is here shown to be of a preferred elongated shape (see Fig. 7), in keeping with the general shape of the nozzle.

The converging nozzle lips 82 and 84 have substantially straightedged base portions which are herein shown to extend substantially parallel and preferably in direct proximity to the outer wall surface of the distributing arm as well as adjacent or approximately tangentially to opposed margins of the associated orifice 80, but which base portions are otherwise arranged without regard to the specific shape of the orifice.

It is a further feature in the design of this nozzle that the lips have forwardly curved or convexly shaped front edges 90 (see Fig. 9), thereby creating a nozzle mouth which has a constricted central portion and widening lateral portions (as clearly shown in Fig. 7).

In view of the fact that it may be desired to provide large orifices towards the outer end of the distributing arms according to the greater volume of liquid to be disseminated at the larger radii, elongated orifices of increasing length may be provided upon the spray pipe. It has been found that with the present nozzle design the same size nozzle, that is a nozzle of the same length, can be used for all orifices with the same high efficiency.

From the foregoing it will be understood that this simple nozzle unit is bodily adjustable up and down, as well as laterally, relative to the orifice 80, and that furthermore the relationship of the lips is made adjustable within such nozzle unit.

It should further be understood that the relative adjustability or movability of the lips can be attained in many other ways aside from the one disclosed in this preferred embodiment. For instance an alternate method of constructing the upper lip might be to make this a casting instead of using spring metal, the weight of the casting maintaining the shape of the spray. In the event that leaves, or sticks, or other solids in the sewage liquid should work through, the lip would rise permitting them to pass.

The distributing arms of the rotor should be continuously drained to prevent freezing of entrapped water in the arms in cold climates. To this end the distributor arm may be provided with a drainage hole 91 at the lower side of the arm (see Fig. 10), and with a splash box 92 including the tabs 93 fixed upon the arm and deflector or baffle 94 which can be fastened upon the tabs as at 95. Where the spray arms are arranged with an upward outward slope the drain is suitably placed near the inner end of the arms, that is near the center of the rotor.

It is also possible to use the nozzle as above described in connection with this drainage opening, and in addition thereto a deflector plate to throw the spray to the desired side. The elbow 18 of the feed inlet pipe is provided at its lowest point with a lateral drain connection 18a which may lead into the filter bed and thus dispose conveniently of the drainage when the machine is emptied. Each arm 13 is at its free end provided with a removable closure member 13a to give access to the interior of the arm from that end, as for a washout.

Explaining more in detail the handling, function, and operation of the machine:

Particularly in large size machines of this type the rotor is a relatively sensitive piece of machinery not only because it must be perfectly aligned, but also because it is required to run with a minimum of friction. It is desirable that the rotor should easily gather speed when starting the sprays, and on the other hand should very gradually come to rest when the water supply is turned off so as to make the distribution of the water over the filter bed as complete as possible all the time.

The proper alignment is insured by the improved bearing arrangement in this machine. With the novel arrangement of the angularly selfaligning and selfcentering spherical roller bearing at the top, and adjustable radial bearing means at the bottom of the rotor properly mounted, there can be no binding between the rotor and the stationary column, and even a certain amount of accidental overbalancing of the rotor can be readily taken up by this bearing arrangement. That is to say, in normal operation the rotor will be so balanced that practically no appreciable load will come upon the radial bearing or guide rollers at the bottom of the rotor. If however due to congestion in an arm or some other incident one side of the rotor should become overbalanced, the radial bearing will take up the load. The thrust bearing at the top will adjust itself to any disalignment however slight, with all the rollers assuming their equal share of the load, and the machine be in operating order and sensitive to the rotative impulse.

The rotor is sealed against the stationary column in a manner which is simple, reliable, cheap and effective. For sealing, use is made of a stuffing box packing which affords effective sealing without requiring high compression, and without causing appreciable friction.

Another detail feature in this design is particularly clear from Fig. 3. It is the relative arrangement of the stuffing box, upon the lower side of the hub 12. To appreciate this feature it should be noted that the levers 53 due to their location between the arms can be freely swung upwardly without interference with parts of the hub if it is desired to release the packing, while the guide rollers 58 are mounted directly upon the lower side of the base of the pipe arms where they find a suitable radial extension of the hub to furnish the bearing point for the adjustable free end of the bell-crank member 60.

With the rotor properly mounted and aligned, feed may be admitted through conduit 11 and the elbow 18 into the head 20. Through the slots 21 in the head it is distributed over the chamber surrounding the head formed by the hub or manifold 12 of the rotor. From here the flow of liquid is split up into different directions as it enters the distributing arms 13. The hub or manifold is square in plan as this shape lends itself to easing the flow into the pipe arms with a minimum loss of head due to entrance restriction.

Due to the arrangement of the weir boxes 69 the supply of liquid to the distributor arms is automatically so controlled that with a relatively low flow of liquid only two opposedly arranged distributor pipes will be supplied, and only upon further rise in head in the supply line will the other two begin to function as feed water is forced over the weirs in the weir boxes into the second pair of arms.

As soon as the water begins to spout from the orifices or nozzles respectively in a direction laterally from the arms, the rotor will start moving in the opposite direction through the reactive force of the sprays.

The adjustability of the nozzles and nozzle lips allows to control the shape, discharge volume, and reactive power of the sprays. It is thus possible to increase the discharge volume from nozzle to nozzle in an outward direction as required by the increased area covered by increasing radii of the arms. If an increase in reactive power is required, this may be had by increasing the reaction at the outer ends of the arms, by increasing the discharge volume at this point, or also by changing the clearance between the nozzle lips thereby causing a narrower spread of the spray and consequently a gain in reactive power.

Such correction in the reactive power may be desirable in order to shorten the period of acceleration of the rotor in an intermittently operating machine.

For instance a preferred manner of operating such reaction machines is with the aid of automatic dosing or siphon tanks. The operation of these tanks consists in accumulating a certain amount of liquid according to their capacity, then automatically setting the machine going at intervals for a predetermined period of say 2½ minutes. Now, in the event that a dosing tank should be too small and not provide sufficient water to give the desired 2½ minutes spray, it may be necessary to restrict some of the flow in the center sprays, particularly on a larger machine, and favor the sprays at the extremity of the bed, in order to secure sufficient reaction at the start to get the machine under way.

In the operation of this nozzle it has been found that the centrally constricted mouth of the nozzle, which is considered a particular feature of the nozzle, produces a spray of a very desirable character. The spray is of even thickness, and spreads in a coherent layer, that is to say with no portions of the spray splitting off and causing losses to reaction.

Furthermore, in particular with high flow velocities in the spray arms, the spray has a tendency toward lateral outward drift, which of course means a loss in reactive power, but it has been found that a lateral shift of the nozzle relative to the orifice upon the arm will correct this drift so that the spray is emitted with its axis at right angles to the arm, and no reactive power lost.

It is important to note that the spread of the spray can be adjusted by controlling the clearance between the lips of the nozzle, which means that with proper adjustment the entire area of the filter bed can be so accurately and completely covered that there will be no uncovered strips of surface. Once this adjustment is made, the surface will be properly covered while the machine is in operation. This means that no portion of the surface and upper strata of the filter bed is unutilized, such strata being considered the most effective ones in this step of sewage treatment.

The new nozzle due to its construction and arrangement is readily accessible not only for adjustment but also for inspection, and congestions which might occur therein due to some solids in the liquid working through, may be readily removed.

I claim:

1. In a liquid distributor, a liquid conducting distributing arm having a longitudinally spaced series of discharge orifices each of any desirable shape, a distributing attachment associated with each orifice for shaping the liquid issuing therefrom into a flattened stream or spray, said attachment comprising a delivery nozzle portion having a pair of lips forming a horizontally elongated mouth, and also a body portion fitted for engagement upon said distributing arm, and means for bodily adjusting the said attachment relative to the orifice substantially in an up and down direction, by which means the delivery volume from any of the orifices can be controlled individually through optional part coverage of the orifice by said nozzle body portion whereby a desirable general shape of the spray is maintained under various operating conditions as the discharging liquid traverses the supporting top surface of the lower lip portion.

2. In a liquid distributer, a liquid conducting distributing arm having a longitudinally spaced series of discharge orifices each of any desirable shape, a distributing attachment associated with each orifice for shaping the liquid issuing therefrom into a flattened spray, said attachment comprising a delivery nozzle portion having an elongated mouth, and also a body portion fitted to engage upon said distributing arm, and means for bodily adjusting the said attachment relative to the orifice, substantially in a direction longitudinally of said distributing arm, by which means an oblique drift of any of the sprays can be individually compensated for in order to set the spray axis relative to the axis of the distributing arm.

3. In a liquid distributor, a liquid conducting distributing arm having a series of longitudinally spaced discharge orifices each of any desirable shape, a distributing attachment associated with each orifice for shaping the liquid issuing therefrom into a flattened spray, said attachment comprising a nozzle having a horizontally wide but shallow mouth portion for delivering the spray, each said attachment also having a body portion fitted to engage upon the exterior surface of said distributing arm, and means for general bodily adjustment of said attachment relative to the surface and said orifice in a manner whereby the character of any of the sprays can be positively controlled as to volume and direction.

4. In a liquid distributor of the reaction driven type, a travelling liquid conducting distributing arm having a longitudinally spaced series of discharge orifices each of any desirable shape, a distributing attachment associated with each orifice for shaping the liquid flowing therefrom into a flattened spray which is directed to effect a driving reaction upon said arm, said attachment comprising a nozzle having a horizontally wide but shallow mouth portion for delivering the spray, said mouth portion constructed to permit a change of the shallow mouth clearance for the purpose of controlling the spread of the spray from said mouth portion, and means for bodily adjusting the mouth portion relative to the orifice, the dual adjustability of the nozzle mouth clearance and nozzle body, respectively, collectively effective to control the character of any of the sprays with regard to volume, direction, and spread, and thereby the reactive influence of the spray.

5. In a liquid distributor of the reaction driven type, a travelling liquid conducting distributing arm having a longitudinally spaced series of discharge orifices, a delivery nozzle arrangement whereby the liquid issuing from an orifice associated therewith is transformed into a flattened substantially horizontal spray which is directed to effect a driving reaction upon said arm, said nozzle arrangement comprising a pair of lip portions having base portions extending directly adjacent said orifice in a manner to form therearound a horizontally elongated mouth said lip portions normally converging in the flow direction of the spray, said nozzle arrangement adapted to furnish a spray of suitable characteristics with regard to shape and direction to insure the required reactive power.

6. In a liquid distributor of the reaction driven type, a travelling liquid conducting distributing arm having a longitudinally spaced series of discharge orifices, a delivery nozzle arrangement whereby the liquid from an orifice associated therewith is transformed into a flattened substantially horizontal spray which is directed to effect a driving reaction upon said arm, said nozzle arrangement comprising a pair of lip portions extending from directly adjacent said orifice to form therearound a horizontally elongated mouth, said lip portions normally converging in the flow direction of the spray, said nozzle arrangement constructed to permit adjustment thereof for controlling the flow characteristics of the liquid delivered from said mouth and thereby the reactive influence of the liquid upon said arm.

7. In a liquid distributor of the rotary reaction driven type, a travelling liquid conducting distributing arm having a longitudinally spaced series of discharge orifices, a delivery nozzle arrangement for and substantially surrounding each orifice, whereby the liquid issuing from the associated orifice is transformed into a flattened substantially horizontal spray which is directed to effect a driving reaction power upon said arm, said nozzle arrangement comprising a pair of lip portions to form a horizontally elongated mouth and normally converging in the direction of flow of the spray, said lip portions arranged to permit adjustment varying the mouth clearance therebetween for the purpose of controlling the spread of the spray with regard to the area to be covered along the path of travel thereof and in a manner to insure the required reactive power.

8. In a liquid distributor, a travelling liquid conducting distributing arm having a longitudinally spaced series of discharge orifices each of any desirable shape, a delivery nozzle arrangement for and substantially surrounding each orifice, whereby the liquid issuing from the associated orifice is transformed into a flattened stream, said nozzle arrangement comprising a pair of lip-portions having base portions arranged to extend adjacent the upper and lower margins respectively of the orifice in a manner to form therearound a horizontally elongated mouth cavity substantially irrespective of the specific shape or size of said orifice, said lip-portions normally converging in the direction of flow of the issuing stream, said mouth shaped with a central constriction of gradually and constantly progressing continuity for effecting a relatively uniform distribution of said stream over a required area.

9. A liquid distributing arrangement according to claim 8, in which the delivery nozzle comprises a pair of lip-portions providing inner faces defined by substantially plane surface elements converging in the forward direction of flow of the spray, said plane surfaces having convexly curved forward limitations by which to form an elongated delivery mouth the opening of which gradually increases in passing from the center to the sides.

10. As an article of manufacture, a spray nozzle device usable in conjunction with a liquid distributing arm having a series of orifices through which pass streams of liquid, said device comprising a body portion in the way of a horizontally elongated frame adaptable to surround said orifice in a manner substantially irrespective of the specific shape or size of the orifice, a pair of lip-portions extending from said body portion and forming therewith a correspondingly elongated mouth cavity for said orifice, said lip-portions providing inner surface elements defined by planes converging in the general forward flow direction of said stream and formed with convexly curved forward ends for defining a delivery mouth of centrally constricted configuration.

11. As an article of manufacture, a spray nozzle device usable in conjunction with a liquid distributing arm having a series of orifices through which pass streams of liquid, said device comprising a body portion in the way of a horizontally elongated frame adaptable to surround said orifice in a manner substantially irrespective of the specific shape or size of the orifice, a pair of lip-portions extending from said body portion and forming therewith a rearwardly substantially unrestricted mouth cavity, said lip-portions converging in the general forward flow direction of said stream and shaped to form an elongated mouth opening of centrally constricted configuration determining the spread and thickness of the spray.

12. As an article of manufacture, a spray nozzle device usable in conjunction with a liquid distributing arm having a series of orifices through which pass streams of liquid, said device comprising a body portion in the way of a horizontally elongated frame adaptable to surround said orifice in a manner substantially irrespective of the specific shape or size of the orifice, a pair of lip-portions extending from said body portion and forming therewith a rearwardly substantially unrestricted mouth cavity, said lip-portions arranged to be movable relative to each other for adjustment of the mouth clearance therebetween and normally converging in the general flow direction of said stream.

13. As an article of manufacture, a spray nozzle device adapted to form into a flattened spray, a stream of liquid issuing from an orifice of any desirable shape, comprising a body portion adapted to surround said orifice, a pair of lip portions extending from said body portion and normally converging in the general flow direction of said stream so as to form an elongated mouth of a desired clearance between the lips, one lip portion being rigid with the frame, the other lip being movable, the arrangement of said movable lip portion allowing for adjustment of a desired mouth clearance between the lips.

14. As an article of manufacture, a spray nozzle device according to claim 13, in which the rigid lip has lateral angular flange portions having inner faces substantially parallel to one another and arranged to embrace said movable lip.

15. As an article of manufacture, a spray nozzle device according to claim 13, in which the rigid lip has lateral angular flange portions having inner faces substantially parallel to one another, and the movable lip is mounted for angular adjustment relative to the other lip between said angular flange portions.

16. As an article of manufacture, a spray nozzle device according to claim 13, in which the rigid lip has lateral angular flange portions having inner faces substantially parallel to one another, and the movable lip is mounted for angular adjustment relative to the other lip between said angular flange portions, and in which the movable lip has lateral angular ledge portions parallel to and adjoining the respective inner faces of said angular flange portions.

17. As an article of manufacture, a spray nozzle device according to claim 13, in which the rigid lip has lateral angular flange portions arranged to embrace said movable lip, said rigid lip portions having an extreme central forward delivery end which extends beyond the forward extremity of said angular flange portions.

18. A nozzle arrangement substantially of the character described, having a two-lipped mouth associable with a liquid-issuing orifice or opening, which nozzle arrangement comprises an upper and a lower lip respectively of substantially flat configuration both lips arranged to converge and having substantially straightedged base portions whose edges extend directly adjacent and substantially tangential to the upper and lower margins respectively of said orifice and otherwise substantially irrespective of the specific shape thereof.

19. In combination with a liquid distributing arm or pipe, a nozzle arrangement having a two-lipped mouth associable with a liquid-issuing orifice in said arm, said nozzle arrangement comprising an upper and a lower lip respectively of substantially flat configuration, said lips converging and having substantially straightedged base portions which extend substantially parallel to and in substantially direct proximity to the outer wall surface of the distributing arm as well as adjacent to opposed margins of the associated orifice but otherwise substantially irrespective of the specific shape thereof.

NELS B. LUND.